United States Patent [19]

Kramer

[11] 4,371,897
[45] Feb. 1, 1983

[54] FLUORESCENT ACTIVATED, SPATIALLY QUANTITATIVE LIGHT DETECTOR

[75] Inventor: Charles J. Kramer, Pittsford, N.Y.

[73] Assignee: Xerox Corporation, Stamford, Conn.

[21] Appl. No.: 257,694

[22] Filed: Apr. 27, 1981

Related U.S. Application Data

[63] Continuation-in-part of Ser. No. 183,132, Sep. 2, 1980, abandoned.

[51] Int. Cl.³ .............................................. H04N 1/24
[52] U.S. Cl. ................................... 358/294; 250/227; 250/228; 358/41; 358/75; 358/293; 358/300
[58] Field of Search ............... 358/294, 293, 75, 41, 358/300; 250/216, 227, 228, 237 R, 578

[56] References Cited

U.S. PATENT DOCUMENTS

| | | | |
|---|---|---|---|
| 3,051,044 | 8/1962 | McNaney | 355/11 X |
| 3,455,637 | 7/1969 | Howard | 356/204 |
| 3,561,846 | 2/1971 | Kingsland | 250/228 |
| 3,603,730 | 9/1971 | Weigl et al. | 178/7.1 |
| 3,681,527 | 8/1972 | Nishiyama et al. | 178/6.6 A |
| 3,728,548 | 4/1973 | Pinior | 250/217 R |
| 3,845,239 | 10/1974 | Granzow et al. | 178/6 |
| 3,980,893 | 9/1976 | Merlen | 250/572 |
| 4,012,585 | 3/1977 | Chen | 358/285 |
| 4,015,081 | 3/1977 | Starkweather | 358/206 |
| 4,042,962 | 8/1977 | Yamaji et al. | 358/300 |
| 4,046,471 | 9/1977 | Branham et al. | 355/14 |
| 4,181,398 | 1/1980 | Sick | 350/96.10 |

FOREIGN PATENT DOCUMENTS

| | | |
|---|---|---|
| 2102 | 2/1979 | European Pat. Off. |
| 1211421 | 2/1966 | Fed. Rep. of Germany |
| 1270840 | 6/1968 | Fed. Rep. of Germany |
| 1962594 | 6/1971 | Fed. Rep. of Germany |
| 54-53915 | 4/1979 | Japan |

OTHER PUBLICATIONS

J. S. Batchelder, et al.; "Luminescent solar concentrators.", Applied Optics, vol. 18, No. 18, Sep. 15, 1979, pp. 3090-3110.
"Triple Function Box", R. A. Thorpe, IBM Tech. Disc. Bulletin, vol. 15, No. 10 (Mar. 1973), pp. 3259-3260.
"Focused Fluorescene Aides Solar Cells", Industrial Research/Development, vol. 21, No. 5, p. 84, May 1979.
"Luminescent solar concentrators. 1: Theory of operation and techniques for performance evaluation", Applied Optics, vol. 18, No. 18, pp. 3090-3110, Sep. 15, 1979.
"Patents Patter", Applied Optics, vol. 20, No. 6, pp. A51-A52, Mar. 15, 1981.
"Studies on the light-focusing plastic rod. 6: The photocopolymer rod of methyl methacrylate with vinyl benzoate", Applied Optics, vol. 20, No. 2, pp. 280-285, Jan. 15, 1981.
"Transfer Mechanisms of Electronic Excitation Energy", Th. Forster, Radiation Research, Supplement 2, pp. 326-339 (1960).
"Efficiency and Stability of Experimental Fluorescent Planar Concentrators", published The Conference Record of the Fourteenth IEEE Photovoltic Specialist Conference, 1980, pp. 760-764.

*Primary Examiner*—Howard Britton

[57] ABSTRACT

A fluorescent-activated spatially quantitative light detector for sensing light reflected from an information bearing surface, said light detector comprising a generally cylindrical rod containing a fluorescent dye dispersed throughout a generally transparent medium and a photosensor at one end of, and in operative association therewith. The reflected light incident on the light detector is absorbed by said dye and reradiated at the fluorescent wavelength, a portion of this reradiated light reaching the photosensor causing an output signal to be generated.

39 Claims, 19 Drawing Figures

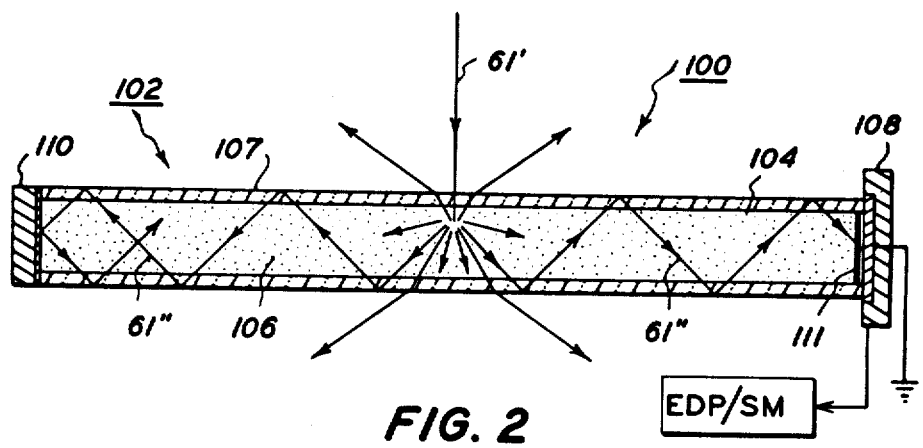
FIG. 2
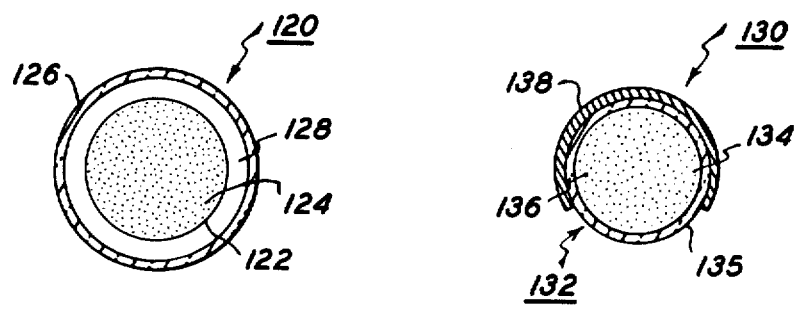
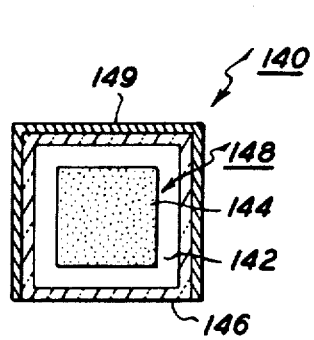
FIG. 6c
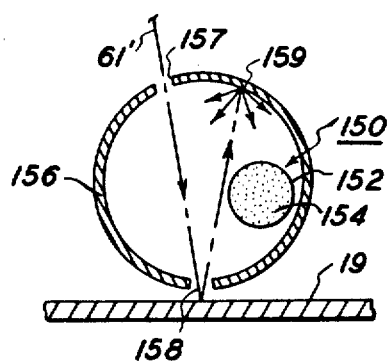
FIG. 6d

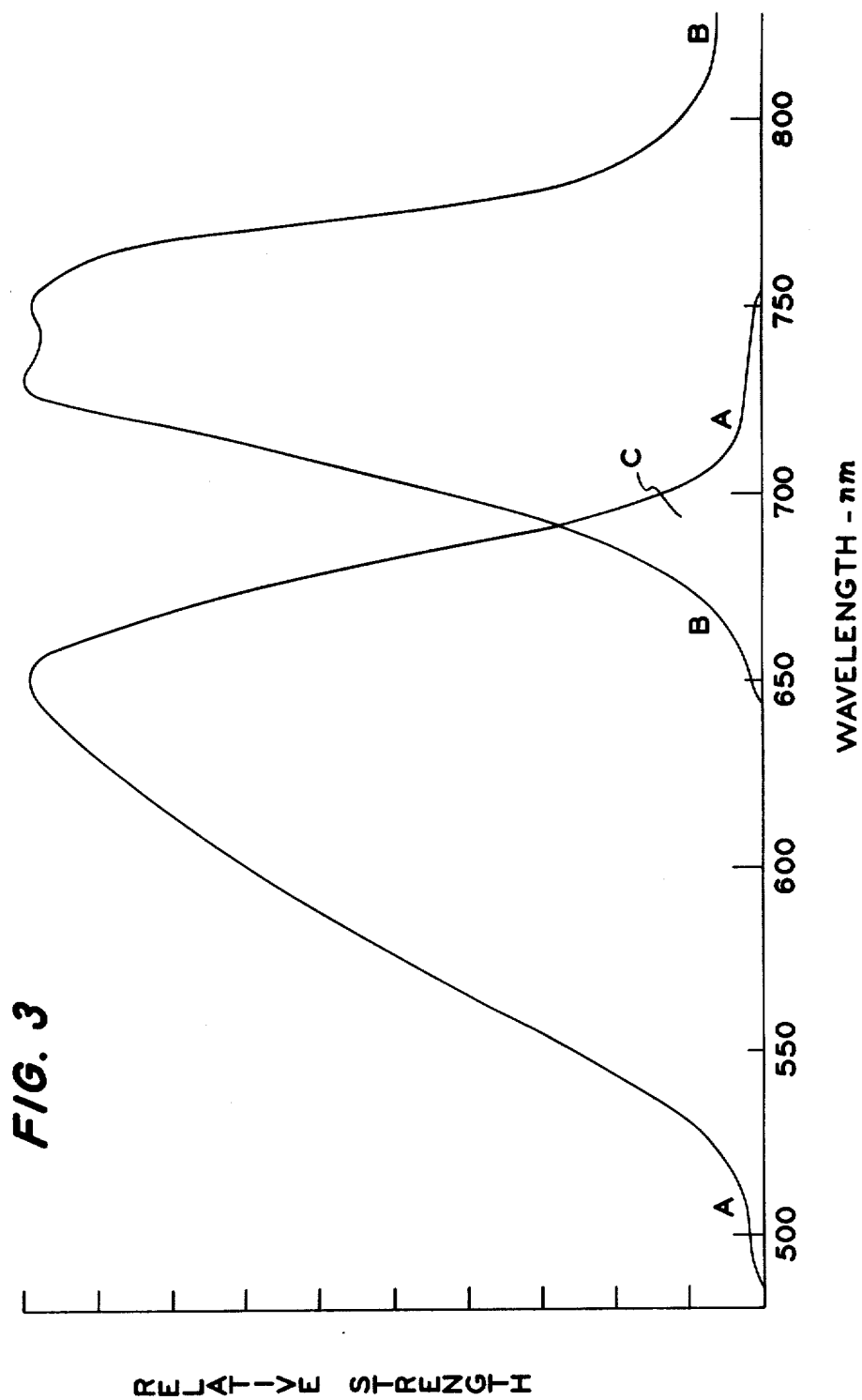

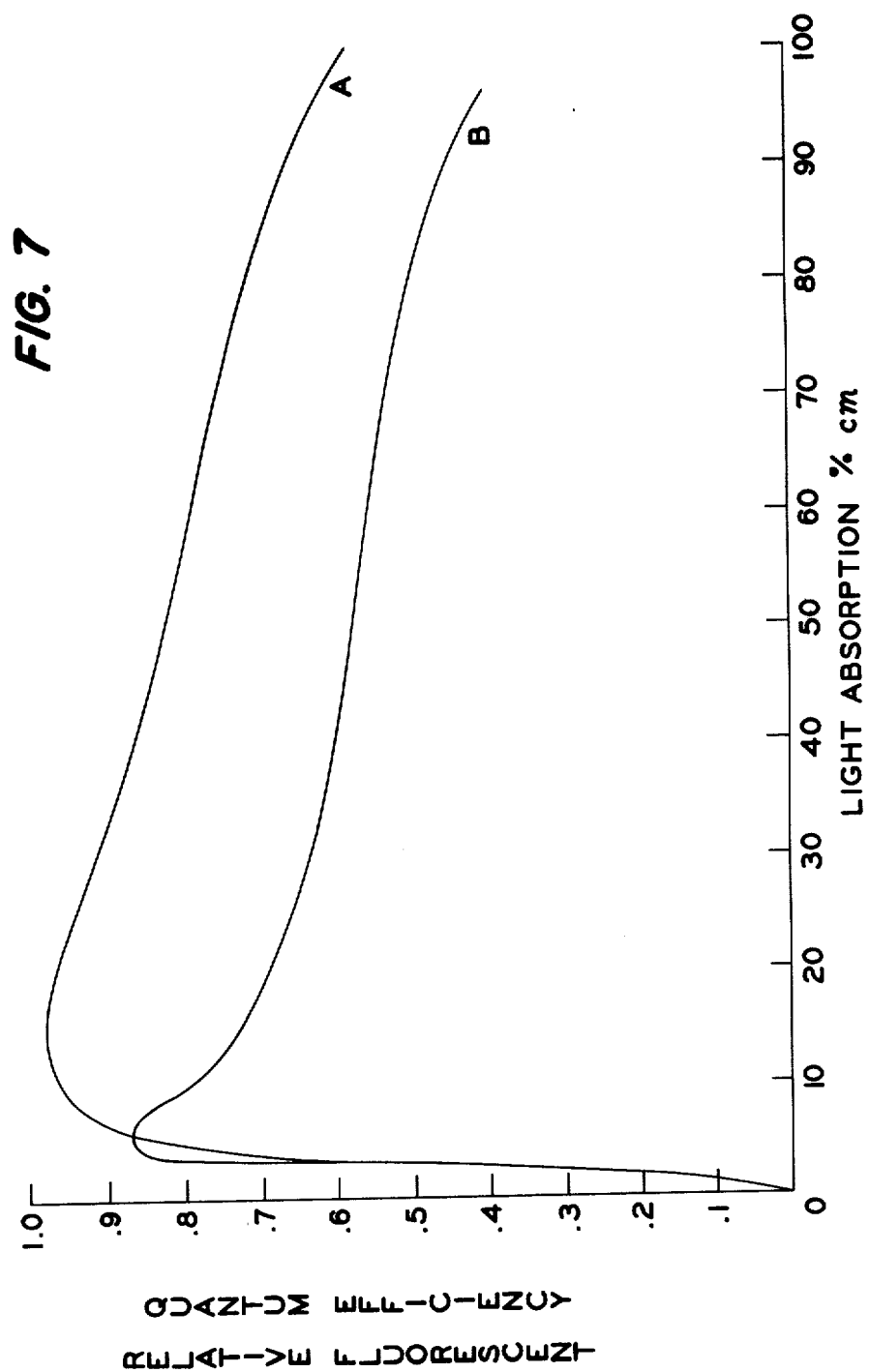

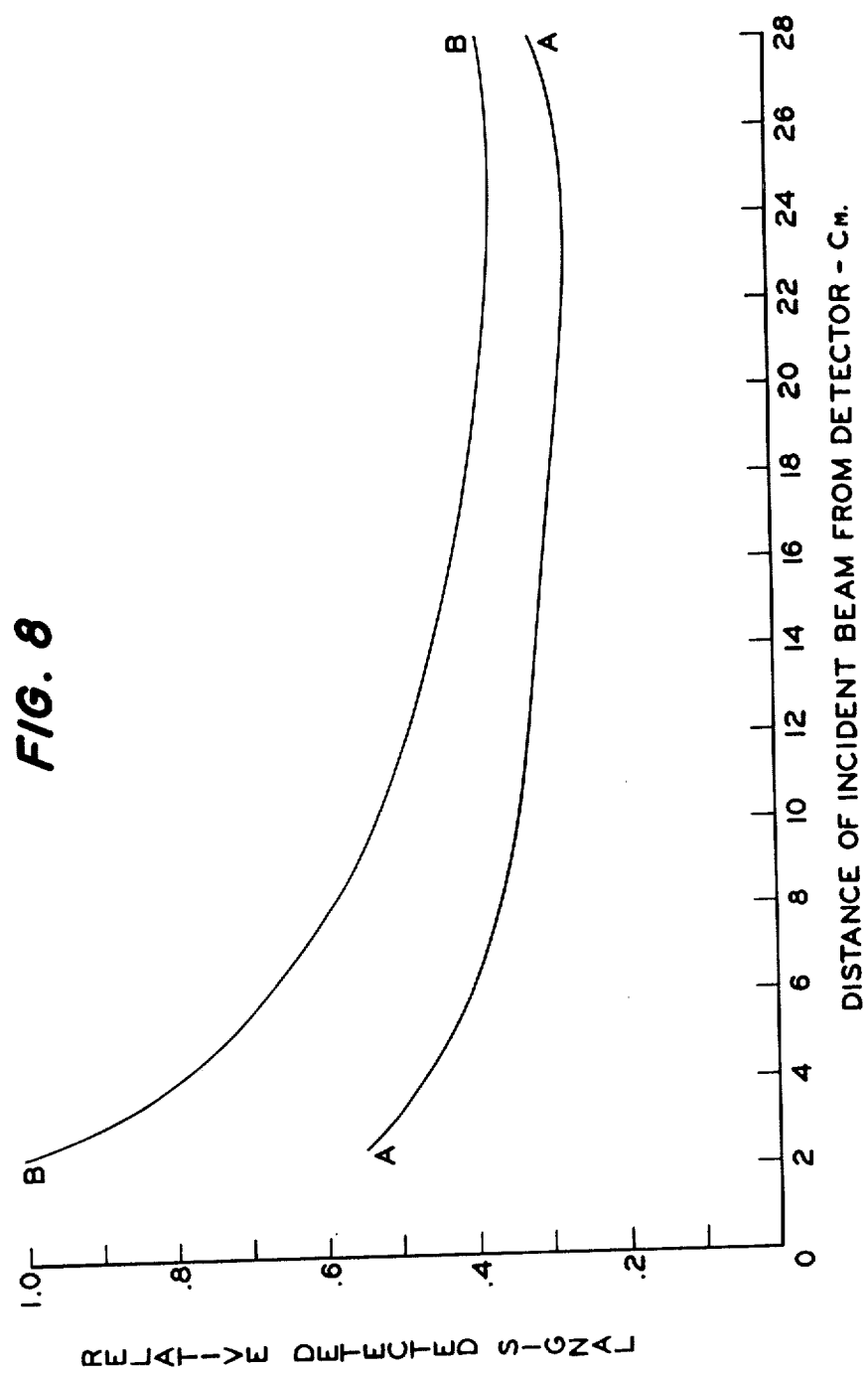

FLUORESCENT ACTIVATED, SPATIALLY QUANTITATIVE LIGHT DETECTOR

This application is a continuation-in-part of my co-pending application Ser. No. 183,132, filed Sept. 2, 1980, and now abandoned.

This invention relates to a light detector for detecting light scattered from an information-bearing surface and, more particularly, to a spatial, quantitative light detector comprising a fluorescent-activated collector member and a photosensing element.

There are a number of present systems in the telecommunication, facsimile and xerographic areas wherein information content on a document is scanned by a flying spot beam; and the light reflections therefrom converted to analog image signals representative of the information being scanned. Typically, a cylindrical light collector is disposed adjacent the document to gather or collect the scattered and reflected light emanating from the document surface and channel the light to a photosensing element. A similar technique is used to scan and detect latent images on a photoconductive surface as disclosed in EPO Publication No. 0002,102 assigned to IBM Corporation or to scan and detect developed toner images as disclosed in copending application Ser. No. 111,520 filed Jan. 4, 1980 and assigned to the same assignee as the present invention.

While light detectors may take various forms, a preferred type, for many of the applications listed above, is an elongated cylindrical rod having at least a portion thereof transparent so as to admit reflected light into the rod. One or more photosensors are placed within the rod (generally at one or both ends) so as to detect light collected by the rod and convert the light into an analog signal representative of the scanned and collected information. Most conventional detectors operate at a low level of efficiency, generally in the order of 0.2%. The reason for this low level of efficiency is that much of the light that enters the collector is lost either by direct transmission through the rod or by being scattered out of the rod after striking a scattering strip generated on a surface of the rod. Only a small portion of the incident light is scattered at a large enough angle to be trapped within the rod and propogate along the rod to the photosensors through the action of total internal reflection. Attempts have been made to improve detector efficiency by applying various reflective or opaque coatings to the exteriors of the rod or by placing the rod in an integrating cavity, as disclosed in my co-pending application Ser. No. 183,134 filed on Sept. 2, 1980, now U.S. Pat. No. 4,321,630. These expedients have resulted in some improvements but still render the collector rods inefficient for many purposes.

From what has been said above, it can be observed that a more efficient collector must be able to redirect incident light at a fairly large angle by some scattering process so as to guide as much of the incident light as possible to the photosensor. And, no less important, the light intensity at the photosensor should not vary strongly as a function of the location of the incident light on the collector rod. In other words, the detected signal should be fairly uniform as the incident beam is scanned along the collector rod.

A first attempt at redirecting incident light so that a greater portion of light enters a guided mode within the collector is disclosed in my co-pending application Ser. No. 183,121 filed on Sept. 2, 1980, now U.S. Pat. No. 4,314,283. In this application, the reflected light is incident on a variable period diffraction grating formed on the surface of a collector rod. A portion of the light incident on the grating is diffracted at angles sufficiently large so as to propagate within the rod by total internal reflections, to the photosensor. Problems still remain with this approach since high efficiency gratings are difficult to fabricate and grating efficiency, in terms of mode coupling, is dependent on the angular spectrum of the incident light. Therefore, there is still room for improvement in both detector efficiency and uniformity.

Applicant, in the present invention, has disclosed an improved, highly efficient, spatial quantitative light detector, the detector, in one embodiment, comprising a collector rod formed of a fluorescent material with at least one photosensor at one end thereof. Depending upon the fluorescent dye selected, up to 100% of incident light is absorbed and re-radiated (scattered) as fluorescent light. This re-radiated light has two important characteristics. Firstly, the scattering is isotropic, i.e. uniform in all directions, resulting in a large percentage of light entering the guided mode so as to be directly coupled to the photosensor. Secondly, the wavelength of the incident light is shifted so that most of the scattered light is not reabsorbed and rescattered by the fluorescent dye. A fluorescent light collector thus serves to both increase the amount of incident light which is scattered at the desired large angles corresponding to guided mode of the rod and to confine more of the scattered light within the rod. Both of these efforts contribute to the greater efficiency of the detector.

The use of fluorescent materials as planar concentrators is known in the art and is described in an article by V. Wittwer et al., "Efficiency and Stability of Experimental Fluorescent Planar Concentrators", published in "The Conference Record of the Fourteenth IEEE Photovoltic Specialist Conference 1980", pages 760-764. See also the article by J. S. Batchilder et al. in the Journal of Applied Optics, Vol. 18, No. 18, Sept. 15, 1979, pages 3090-3110. A fluorescent radiation converter is also described in an article published in the Journal of Applied Optics, Vol. 20, No. 6, Mar. 15, 1981, page A52.

However, the use of a fluorescent activated material in a spatial quantitative light detector is not known in the art. The following description describes various embodiments of a fluorescent activated collector in combination with coatings and structure to improve uniformity. These embodiments are described in conjunction with the following figures.

FIG. 2 is a cross-sectional view showing details of the light detector of this invention used in the apparatus shown in FIG. 1.

FIG. 3 is a graphical representation of the absorption spectrum and fluorescent emission spectrum of a representative fluorescent dye.

FIGS. 6a, 6b, 6c and 6c are optional configurations in cross-section of the light detector of this invention.

FIG. 7 is a graphical representation of the relationship between collector efficiency and dye concentration in a light detector of this invention.

FIG. 8 is a graphical representation of data obtained in use of a preferred embodiment of this invention.

Figure 1:
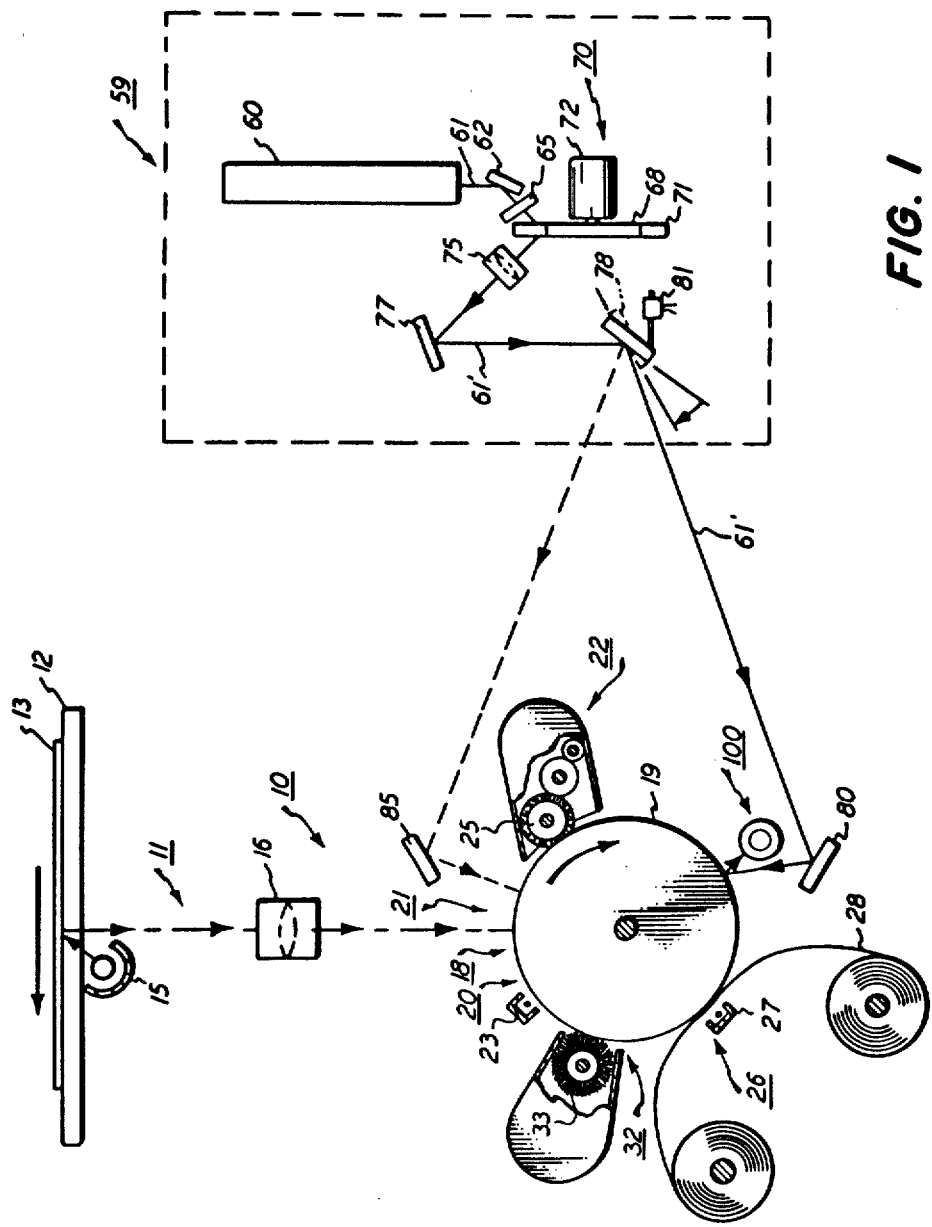
FIG. 1 is a schematic view showing utilization of a fluorescentactivated, spatial quantitative light detector in an apparatus for carrying out multiple function image processing.

Referring now particularly to FIG. 1 of the drawings, there is shown a xerographic type reproduction apparatus 10 incorporating a fluorescent-activated light detector. Xerographic reproduction apparatus 10 includes a viewing station or platen 12 wherein document originals 13 to be reproduced or copied are placed. For operation in the COPY mode, a light/lens imaging system 11 is provided, the light/lens system including a light source assembly 15 for illuminating the original 13 at platen 12 and a lens 16 for transmitting image rays reflected from the original 13 to the photoconductive surface 19 of drum 18 at exposure station 21.

Charging, developing, transfer and cleaning stations 20, 22, 26 and 32, respectively, are disposed about drum 18 in operative relation thereto. Charging station 20 includes a corona charging means 23 for depositing a uniform electrostatic charge on photoconductive surface 19 in preparation for imaging. A suitable developing mechanism, which may, for example, comprise a magnetic brush 25, is provided at developing station 22 for developing the latent electrostatic images created on surface 19.

At transfer station 26, corona transfer means 27 effects transfer of the developed image to a suitable copy substrate material 28. A suitable drum cleaning device such as a rotating cleaning brush 33 is provided at cleaning station 32 for removing any remaining developer material from surface 19. Brush 33 may be disposed in an evacuated housing through which developer materials removed from the drum surface by the cleaning brush are exhausted.

In the example shown, photoconductive surface 19 comprises a uniform layer of photoconductive material such as amorphous selenium on the surface of drum 18. Drum 18 is supported for rotation by suitable bearing means (not shown). A suitable drive motor (not shown) is drivingly coupled to drum 18 and rotates drum 18 in the direction shown by the solid line arrow when processing copies.

When operating in the COPY mode, the photoconductive surface 19 of drum 20 is charged to a uniform level by corona charging means 23. Platen 12 and the original document 13 thereon is irradiated by light assembly 15, the light reflected from document 13 being focused onto the photoconductive surface 19 by lens 16 at exposure station 21. Platen 12 and the document 13 thereon are at the same time moved in synchronism with rotation of the drum 18. The light reflected from the original 13 selectively discharges the charged photoconductive surface in a pattern corresponding to the image that comprises the original document.

The latent electrostatic image created on surface 19 is developed by magnetic brush 25 and transferred to copy substrate material 28 through the action of transfer corona means 27. Following transfer, the photoconductive surface 19 is cleaned by cleaning brush 33 to remove leftover developer material. A suitable fuser or fixing device (not shown) fixes the image transferred to copy substrate material 28 to render the copy permanent.

While a drum type photoconductor is illustrated, other photoconductor types such as a belt, web, etc. may be envisioned. Photoconductive materials other than selenium, as for example, organic photoconductors may also be used. And, while a scan type imaging system is illustrated, other types of imaging systems such as full frame flash, may be used.

The photoconductor may be opaque, that is, impervious to light, or wholly or partially transparent. The exemplary drum 18 typically has an aluminum substrate which renders the drum opaque. However, other substrate materials such as glass may be used, which would render drum 18 wholly or partially transparent. One material consists of an aluminized Mylar substrate having a layer of selenium dispersed in poly-N-vinyl carbazole with a transparent polymer overcoating containing a charge transport compound such as pyrene.

Xerographic reproduction apparatus 10 includes a flying spot scanner 59. Scanner 59 has a suitable flux source of electromagnetic radiation such as laser 60. The collimated beam 61 of monochromatic radiation generated by laser 60 is reflected by mirror 62 to a modulator 65, which for operation in the WRITE mode, modifies the beam 61 in conformance with information contained in image signals input thereto, as will appear. Modulator 65 may comprise any suitable modulator, such as acousto-optic or electro-optic type modulators for imparting the informational content of the image signals input thereto to beam 61.

Beam 61 is diffracted by disc deflector 68 of a holographic deflector unit 70. Deflector 68 comprises a substantially flat disc-like element having a plurality of grating faces or facets 71 forming the outer periphery thereof. Deflector 68, which is preferably glass, is driven by motor 72. Preferably, deflector 68 is disposed so that light beam 68 is incident to the facets 71 thereof at an angle of substantially 45°. The diffracted scanning beam 61' output exits at a complementary angle.

The scanning beam 61' passes to an imaging lens 75. As shown, lens 75 is located in the optical path between deflector 68 and mirror 77, lens 75 having a diameter suitable to receive and focus the scanning light beam diffracted by facets 71 of deflector 68 to a selected spot in the focal plane proximate the surface 19 of drum 18, as will appear.

The scanning beam 61' from lens 75 is reflected by mirror 77 to read/write control mirror 78. Mirror 78, when in the solid line position shown in the drawings, reflects beam 61' to mirror 80 which, in turn, reflects the beam to a location on the surface 19 of drum 18 downstream of developer 22.

In the case where the photoconductive material is opaque, light impinging on the surface 19 of drum 18 is scattered. In the case where the photoconductive material is transparent, the light is transmitted, depending on the degree of transparency of the photoconductive material, through the photoconductive material to the drum interior. As will be understood, scattered light is composed of both specular and diffuse reflected light while transmitted light is composed of specular and diffuse transmitted light. The scattered or transmitted light from the photoconductive surface 19 and the developed image thereon is collected in fluorescent-activated light detector 100, and there converted to image signals when operating in the READ mode, as will appear.

Read/write control mirror 78 is supported for limited movement between a read position (shown in solid line in the drawing) and a write position (shown in dotted line in the drawing). A suitable driving mechanism such as solenoid 81 is provided to selectively move the mirror 78 from one position to the other. Return spring means (not shown) may be provided to return mirror 78 to the original position upon deenergization of solenoid 81.

When in the WRITE position (the dotted line position), the scanning beam 61' is reflected by mirrors 78, 85 to a location on the surface of drum 18 upstream of developer 22.

While FIG. 1 illustrates one type of apparatus utilizing the light detector 100 of this invention, many other embodiments are contemplated. Thus, other apparatus disclosed in my copending application, together with David B. Kay and Christopher Snelling, Ser. No. 111,520 filed Jan. 14, 1980, are incorporated herein by reference.

Referring to FIG. 2, fluorescent activated light detector 100, shown in cross-sectional view, comprises an elongated cylindrical collector rod 102 containing a fluorescent medium 104. Medium 104 is a liquid or solid containing dissolved fluorescent dye 106. Dye 106 is represented herein as dots throughout medium 104 but, in actuality, said dye is molecularly dispersed in the medium. In the embodiment wherein the medium 104 is a solid, rod 102 is integral with the medium or, in other words, the medium is self-supporting. In such embodiment, a transparent cladding 107 protects the rod from contamination. Incident light beam 61', at a wavelength a enters rod 102, is absorbed by the fluorescent dye and is reradiated almost instantaneously at wavelength b. This spontaneous reradiation or scattering is isotropic in nature and, as shown, a large portion of the scattered light, typically 50%, becomes trapped within guided modes of the rod and proceeds along the rod by being totally internally reflected from the rod surface. For a cylindrical shaped rod, the ratio of trapped light $P_t$ to the total reradiated light field P, is given by:

$$C = P_t/P = 1 - \frac{2\sin^{-1}n}{\pi} \tag{1}$$

where n is the ratio of the reflective index of the medium surrounding the rod to the index of the fluorescent medium.

As the light propagates along the tube, a portion proceeds directly to photosensor 108 while another portion reaches the photosensor via reflection from reflective surface 110. Since most of this light is at a different wavelength then the incident light, it is not reabsorbed and rescattered by the fluorescent light during its propagation. (A small portion is reabsorbed and this subject is addressed in further detail as will be seen).

Photosensor 108, for greatest efficiency, is preferably in contact with medium 107 and has a high sensitivity at the fluorescent wavelengths. While any suitable reflector material may be used to form surface 110, copper, silver or gold are preferred because of their relatively higher reflectance at the fluorescent wavelengths generated by a He-NE laser. Filter 111 is used to block certain portions of the fluorescent spectrum for purposes discussed in more detail below.

The electrical signals produced by the photosensor are transmitted to an electronic data processing/storage means represented in FIG. 2 by box EDP/SM. Such means are well known in the art and are part of a system which can store, convert, transmit or otherwise utilize the electronic information created by scanning graphic information as described above.

Fluorescent materials suitable for use in the collector rod shown in FIG. 2, and in the other embodiments to be described below, are known in the art and are typically dyes which are dissolved in a liquid or solid medium. For example, typical fluorescent dyes include Rhodamine 6G, Cresyl Violet, Nile Blue A perchlorate, oxazine perchlorate, fluorescein, 1,2-di-1-naphthylethylene, 1,4-bis[2-4-methyl-5-phenyloxazolyl]] benzene, amino G acid, anthracenes such as 9,10-diphenylanthracene, 9,chloroanthracene, Perylene Coronene, 7-hydroxycoumarin and acridine yellow. Many other fluorescent dyes may be utilized as are listed in various publications such as Eastman Kodak Company Data Service Publication JJ-169 (1979) entitled, "Eastman Laser Dyes" and Vol. 1 of Topics in Applied Physics, entitled "Dye Lasers" edited by E. P. Schafer and published by Springer-Verlay, New York, N.Y. (1973). Both publications are incorporated herein by reference.

It is typical to include the fluorescent dyes of this invention in a liquid or solid medium. For purposes of this invention, solid media is preferred because of its durability and ease of shipping and handling. However, this invention is not to be limited by the media in which the dye is dissolved. Typical liquid media are those utilized in dye lasers and include organic solvents such as chloroform, benzene, toluene, ethanol, ethylene glycol, glycerl, heptane, and many others as are listed in the above-mentioned Vol. 1 of Topics in Applied Physics. Commonly available dye solutions are published in Eastman Kodak company Data Service Publication JJ-169 (1979) entitled "Eastman Laser Dyes."

Preferred solids are transparent polymers having dimensional stability under the conditions of use herein. Typically, suitable polymers and copolymers include polycarbonates such as Lexan, commercially available from the General Electric Company, and Merlon, commercially available from the Mobay Chemical Company, polystyrenes, polyesters such as polyarylates and polysulfonates, acrylates such as polymethyl methacrylate, commercially available under the tradename Lucite from E. I. duPont de Nemours & Company, Inc., and Plexiglass from the Rhom & Haas Company, acrylonitrile methacrylate copolymers such as is available under the tradename Barex from Vistron Corporation, and condensation resins such as arylsulfonamide/formaldehyde resin available under the tradename Sanfolite MHP from Monsanto Company. Any other suitable, relatively transparent material can be utilized as the choice of supportive medium.

The detector embodiment shown in FIG. 2 serves to illustrate the operative principles upon which a fluorescent-activated spatial quantitative light detector may be constructed. This detector may be improved and modified in ways which enhance efficiency and/or improve the uniformity of the collected signal. These improvements may be classified as follows:

1. Elimination of non-uniformity effects caused by the small amount of light that is reabsorbed and rescattered by the fluorescent medium after the initial absorption and reradiation.
2. Elimination or reduction of the non-uniformity effects caused by loss, or leakage of light which is scattered at less then the critical guided mode angles ("leaky" modes).
3. Elimination of the effects of surface scattering by contaminants or scratches on the exterior surfaces of the rod.
4. Selection of a fluorescent dye solution having an optimum quantum efficiency.
5. Modification of fluorescence along the length of the collector rod (Improvement of uniformity.).

These improvements are considered separately below.

REDUCING NON-UNIFORMITY ATTRIBUTABLE TO REABSORPTION

The reabsorption phenomenon is illustrated by reference to FIG. 3. In this figure, curve A represents the absorption spectrum of a typical fluorescent dye, oxazine 1, perchlorate in a glycerine medium. Curve B of FIG. 3 is the spectrum of the emitted fluorescent light by the dye upon absorption of incident light. (In general, the peak and shape of the absorption and fluorescent spectrum of a dye is dependent on the solvent used and the spectral shift is to larger wavelength when either a larger molecular or higher viscosity solvent is used. And, although there is some energy loss during the wavelength shift, the aforementioned sensitivity as matching of photodetector 108 to the higher wavelength minimizes this loss).

As shown in FIG. 3, there is small area, C where the curves overlap. It is in this area C that reabsorption and hence reradiation of the fluorescent light takes place. From Equation (1), about half of this reradiated light is lost to the collector. Thus, collector efficiency is unavoidably proportionately reduced. Collector uniformity is also affected since the effects of reabsorption vary depending upon the point at which the incident beam strikes the collector rod, i.e. the greater the distance from the photosensor, the greater the chances that the trapped light will be reabsorbed. These signal non-uniformity effects can be reduced by the filtering techniques described below.

Figure 4:
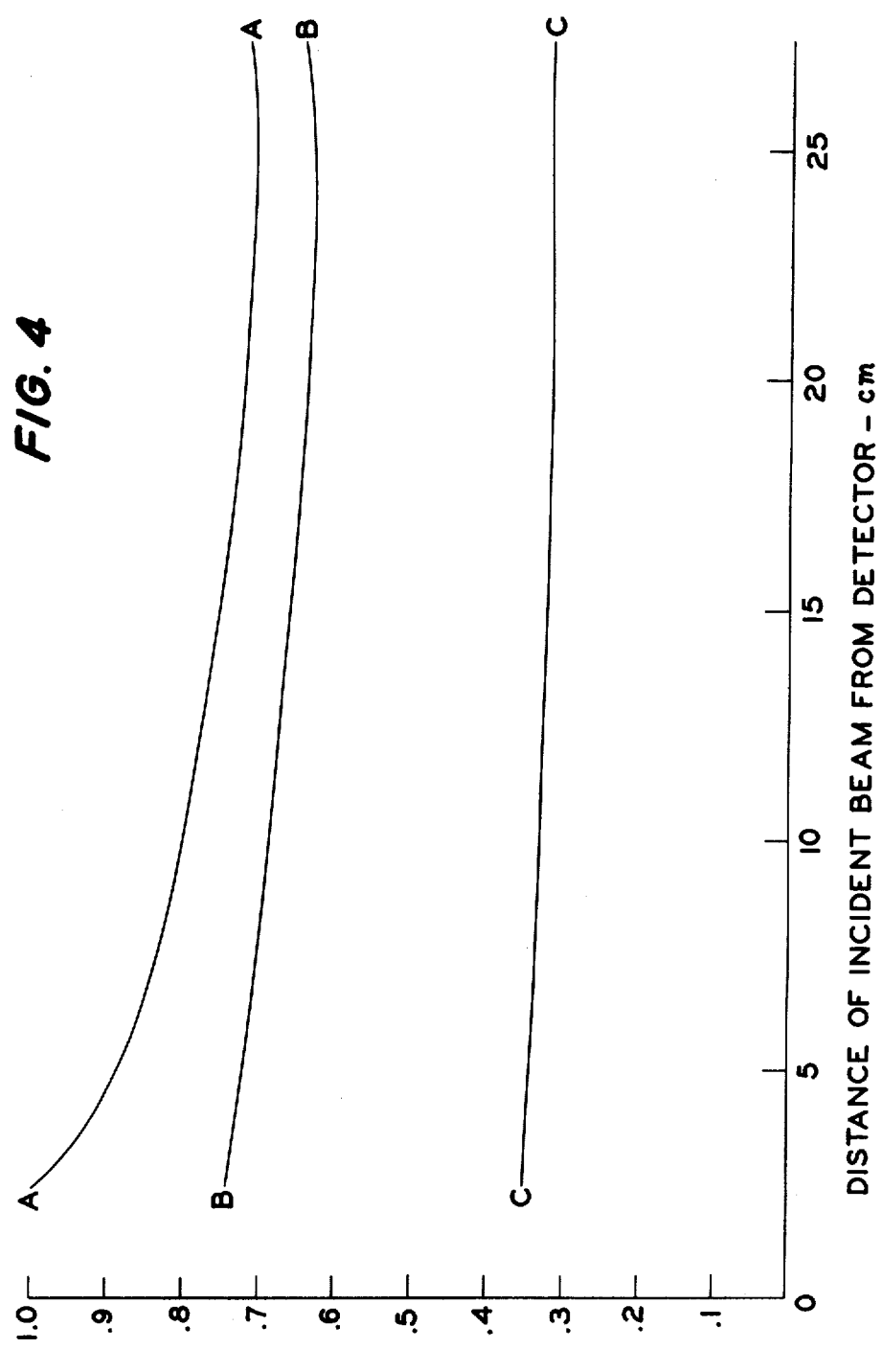
FIG. 4 is a graphical representation of data obtained with a fluorescent light detector of this invention indicating the degree of signal uniformity as modified by the use of spectrum filters.

Referring again to FIG. 2, filter 111 is inserted in front of photosensor 108 to block the shorter wavelengths of the fluorescent spectrum and thereby smooth, or make more uniform, the detected signal. To illustrate the effect of incorporating filter 111 into the detector of this invention, there is illustrated in FIG. 4 a graphical presentation of data obtained with various filters. A fluorescent medium was constructed by dissolving Rhodamine 6G in a solvent composed of 70 percent ethylene glycol and 30 percent ethanol by volume. The concentration of the dye resulted in an absorption factor of 95 percent/cm. That is, 95 percent of the light transmitted through the solution is absorbed within 1 cm. of travel. The solution was contained in a tube 28.2 cm. in length and 9.6 cm. in diameter. The input radiation is 514 nm and the fluorescence was in the range of about 590 nm. Three different filters were inserted between the collector and the photosensor and the length of the collector then scanned by the radiation. The relative strength of the detected signal is plotted in relationship to the distance of incident light from the photosensor in FIG. 4. In FIG. 4, curve A indicates the results obtained utilizing a Corning clear filter 5850; curve B utilizing a Corning orange filter 2434 and curve C utilizing a Corning red filter 2418. As is seen in FIG. 4, the end-to-end variation in relative strength of the detected signal is greatly improved utilizing the red filter of curve C. Such filter eliminates the short wavelengths of the fluorescent spectrum produced by the Rhodamine dye. The uniformity variation for Curve A is ±14.5 percent while the variation for curve B is ±7.4 percent. Curve B offers the best tradeoff providing a response almost as flat as curve C but with a lower energy loss. Curve C utilizing the deep red filter, has a variation of ±5.2 percent while achieving 42 percent of the unfiltered detector signal. This data indicates that at least half of the end-to-end collector uniformity variation for this dye is due to self absorption and that spectrum filtering techniques are a valuable tool for improving detected signal uniformity.

"LEAKY" MODES

As previously mentioned, approximately 50% of the light radiated by the fluorescent medium is coupled to a guided mode. Of the remaining noncoupled fraction, a portion, perhaps 10%, is transmitted instantly out of the rod while the remaining 40% is radiated at angles less then the critical total internal reflection (TIR) or coupling angle. These radiated light rays propagate down the rod towards the photosensor and, depending upon point of origin and internal reflection angle, some may impinge on the photosensor while others may not. With each reflection, part of the non-TIP ray energy "leaks" out of the rod, the total effect contributing to the non-uniformity of the detected signal.

The light intensity $I_d$ for a leaky mode at photosensor 108 is represented by the formula $$I_d = I_o R^m \qquad (2)$$

where $I_o$ is the initial intensity of the mode, R is the reflectivity from the inner surface of the rod and m is the number of reflections that the mode undergoes before reaching the photodetector. From this equation, it is evident that the further the incident beam is from the photosensor, the larger will the value of m be and the less of a factor a leaky mode will be to the overall signal level at the photosensor. In other words, at a certain distance from the photosensor only light rays travelling in the guided mode will influence the output signal. From this observation, it would be beneficial if all leaky modes effectively originate at some significant distance from the photodetector so that all of the leaky mode energy is dissipated before arrival. As a practical matter, only the leaky modes propagated so as to arrive at the photodetector after only a few reflections will seriously distort uniformity of the output signal. According to another aspect of the present invention, the photosensor is spaced from the end of the rod to reduce the leaky mode contribution to signal non-uniformity as will be shown in the following description of FIGS. 5a, 5b and 5c.

Figure 5A:
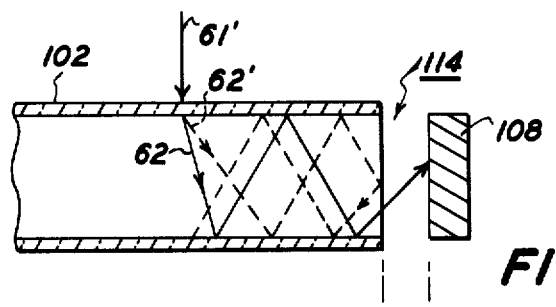
FIGS. 5a, 5b and 5c are a cross-sectional view of the FIG. 2 embodiment showing alternate photosensor locations.

Referring to FIG. 5a, an air gap 114 has been introduced between the end of collector rod 102 and photosensor 108. As incident light beams 61' generates beams 62, 62' after absorption. Beam 62 is totally internally reflected from the sides of the rod and therefore enters a guided mode. Beam 62' strikes the sides of the rod at less than the critical TIR angle and therefore constitutes a leaky mode. As shown, the end of rod 102 is essentially perpendicular to the sides of the rod and, under this condition part of guided mode ray 62 is transmitted by the rod end interface to the photosensor. Leaky mode ray 62' however, is reflected at the end surface back into the rod and is thus prevented from reaching the photosensors. A spacing d of only a few wavelengths of light would suffice to perform the desired blocking function.

Figure 5B:
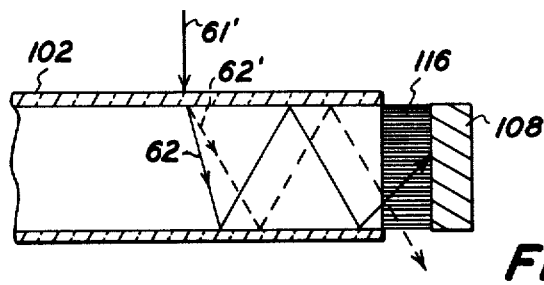

FIG. 5b illustrates a second variation wherein the photosensor 108 is optically coupled to collector rod 102 via optical fiber bundle 116. In this embodiment, some of the leaky energy mode will arrive at the detector but at a reduced level since some energy will leak out through the fiber bundle.

Figure 5C:
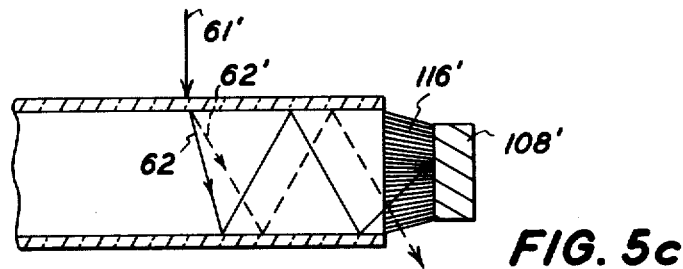

FIG. 5c is a variation of FIG. 5b where the fiber bundle 116' is tapered. In this embodiment, an added benefit is the use of a small area photosensor 108' thereby reducing capacitance and improving system bandwidth.

SURFACE SCATTERING

Impurities and imperfections on the surface of the collector rod, such as dust and dye spills, and scratches produce undesirable scattering effects both on the indicent light beam and on the trapped light as it propagates by TIR along the length of the collector. Both detector efficiency and uniformity are adversely affected. FIG. 6 illustrates several collector embodiments designed to reduce surface scattering effects. The embodiments also serve to suggest other configurations that the detector may assume consistent with the principles of the invention.

For each embodiment, the surface of the fluorescent medium, if in solid rolled form, or the encapsulating cover, if in the liquid form, should be thoroughly cleaned. From Equation (1), it is seen that the material surrounding the collector rod should have as low an index of refraction as possible. Air (index of 1.0) is therefore an ideal cladding material and is so used in the FIGS. 6a, 6c and 6d.

Referring to FIG. 6a, detector 120 comprises a cylindrical fluorescent rod 122 containing dissolved fluorescent dye 124. Rod 122 is encased within glass tube 126 leaving an entrapped air or gas space 128 to serve as the cladding for the rod.

In FIG. 6b, detector 130 compises cylindrical rod 132 comprising a liquid fluorescent medium 134 contained within glass cladding 135. Medium 134 contains dissolved fluorescent dye 136. A highly specular reflective coating 138 covers a large portion of the collector surface. The incident light enters the rod through the uncoated portion, or entrance window, which can be kept clean by maintaining an air flow over its surface. This embodiment increases the efficiency of the collector by trapping more of the scattered light within the rod. The output signal uniformity can be maintained by modifying the shape and/or density of coating 138 as described in further detail in the description of FIG. 11 or by varying the spatial transmission coefficient of the entrance window.

Referring to FIG. 6c, detector 140 is a solid, rectangular fluorescent member 142 containing fluorescent dye 144. Member 142 is encased within glass tube 146 leaving an encapsulated air space 148 to serve as the cladding for the rod. Reflective coating 149, which can be specular or diffuse, serves the same purpose as coating 138 described above in connection with FIG. 6b.

In FIG. 6d, detector 150 is a cylindrical fluorescent rod 152 containing dissolved fluorescent dye 154. Rod 152 is contained within integrating cavity 156. The concept of using an integrating cavity, per se, as a light detector is disclosed in my co-pending application Ser. No. 183,134 whose contents are hereby incorporated by reference. In the present embodiment, the interior surface of cavity 156 is coated with a highly reflective material such as Celanese polyester thermal setting paint #741-13. Incident light beam 61' enters the cavity through entrance slit 157, passes through exit slit 158 and is reflected from surface 19 back into cavity 156 striking surface strip 159 on the interior wall of cavity 156. Light is then reflected from the cavity wall to provide multiple diffuse reflections of the light, much of which is eventually incident on rod 152 to be reradiated at the fluorescent wavelength. The rod, in this embodiment, may be kept clean by pressurizing the cavity to maintain a positive pressure barrier. The effectiveness of this embodiment is described in connection with the discussion of FIG. 7 covered in the following discussion of quantum efficiency.

OPTIMUM QUANTUM EFFICIENCY

The quantum efficiency of the dye solution of the fluorescent collector rod is related to dye concentrations as illustrated by the graph plots of FIG. 7. In the figure, curve A represents data obained by plotting light absorption vs quantum efficiency for a Nile Blue A perchlorate in chloroform. Curve B represents the data for Cresyl Violet perchlorate in isopropyl alcohol solution.

Fluorescent quantum efficiency is defined as the ratio of the number of quanta emitted to the number of quanta absorbed. The quantum efficiency data was obtained by simultaneously measuring the dye cell transmission and fluorescent output. Quantum efficiency fall off with dye concentration (greater light absorption) as shown in FIG. 7 is due to quenching effects. The basic equation defining the relationship of fluorescence F to dye concentration is:

$$F = \phi I (1 - e^{-\epsilon b c}), \quad (3)$$

where $\phi$, $\epsilon$ and C are, respectively, the quantum efficiency, molar absorptivity, and molar concentration of the dye; I is the incident radiant power, and b is the path length of the dye cell. For very dilute solutions this equation reduces to a linear relationship between fluorescence and concentration. For a linear response to be obtained the solution must absorb less than 5% of the exciting radiation. The relationship between cell transmittance, $I_T$, and dye concentration is given by Beer's law:

$$I_T = I e^{-\epsilon c b} \quad (4)$$

The product of $\epsilon$ and c is termed the absorption coefficient, $\alpha$, of the solution. With the aid of Bouguer's law, $$I_T = I e^{-ab}, \tag{5}$$

the absorption factors presented in FIG. 7 can be related to the absorption coefficient and the transmittance of any thickness cell can be calculated.

Several observations and deductions can be made from the results of FIG. 7 and the relationships set forth above. The first, restated, is that the collector quantum efficiency is inversely related to the dye concentration. But, total collector efficiency is also dependent on the total amount of light which is absorbed and reradiated. If the dye concentration in a rod of fixed diameter is simply diluted, less light is being absorbed and the total efficiency may decrease. One obvious way to increase the total efficiency would be to increase the rod diameter thereby increasing the total amount of light reradiated. There are practical limits, however, to the rod size since it must bear some fixed relationship to the photosensor size, typically 1 cm. The rod thickness can be effectively increased, however, without physically increasing the rod thickness. This can be done by placing a reflective coating around the collector as shown in the FIGS. 6b, 6c embodiments. These configurations provide a second fluorescence component via the reflection from the coatings thereby effectively doubling the amount of reradiated light.

The detector size is also effectively increased by placing a rod within the integrating cavity configuration shown in FIG. 6d. FIG. 8 shows the data obtained by placing a rod containing the Cresyl Violet solution described above having an absorption factor of 80%/cm. Measurements were made of relative detector signals at different distance from the detector for a bare rod (curve A) and for the same rod placed in the FIG. 6d configuration (curve B). From the results shown in FIG. 7, enclosing the rod in the integrating cavity increases its mean signal level by 47%. About 40% of this total gain is due to the larger absorption associated with the "increase" of the effective rod diameter with the remainder of the gain attributed to the integrating cavity contribution. This particular configuration of a rod within an integrating cavity is thus a very desirable embodiment of the present invention. There is a remaining problem with signal non-uniformity, however, since the random nature of the re-reflections within the cavity produce a similarly random result along the surface of the rod. The following section discusses some methods of improving uniformity of a collector in this (and other) environments.

IMPROVING COLLECTOR UNIFORMITY

Figure 9:
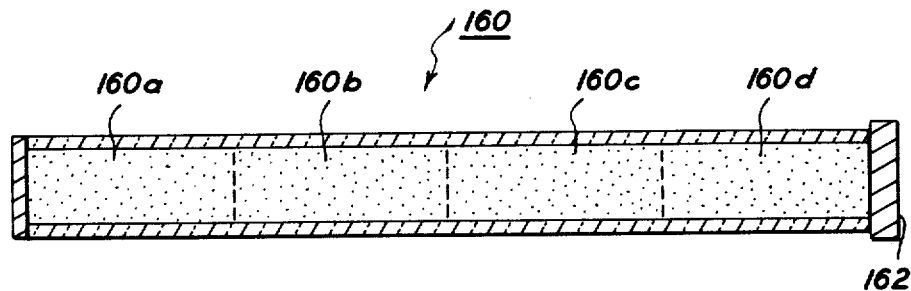
FIG. 9 is a cross-sectional view of a fluorescent collector having multiple dye concentration segments.

Factors contributing to non-uniform photosensor signals have been discussed in the immediately preceding sections as well as the section relating to reabsorption effects. The kernel of the problem is that the photosensor is "seeing" the sum of a plurality of fluorescent light levels differing each from the other in relation to their distance from the photosensor at their incidence point. A light beam incident at a point in close proximity to the photosensor provides a higher signal, all other things being equal, then a signal incident at the center (or other end) of the rod. The remedy, in general, for this problem is to smooth out the response so that the photosensor is receiving a uniform level regardless of the incidence distance of the information beam. There are several ways of accomplishing this. These are listed below and each is discussed in further detail:

1. The dye concentration can be varied along the length of the collector rod by impregnation, or other techniques. FIG. 9 illustrates an embodiment wherein the rod of FIG. 2, now labeled 160, has been divided into four solid fluorescent segments each segment optically joined to the other. Segment 160a has been selected to have the highest dye concentration relative to segments 160b, 160c, 160d, each of which has a progressively lower dye concentration. The concentration can be selected so that the percentage of incident light absorbed in each segment produce the same fluorescent level signal at photosensor 162.

Figure 10:
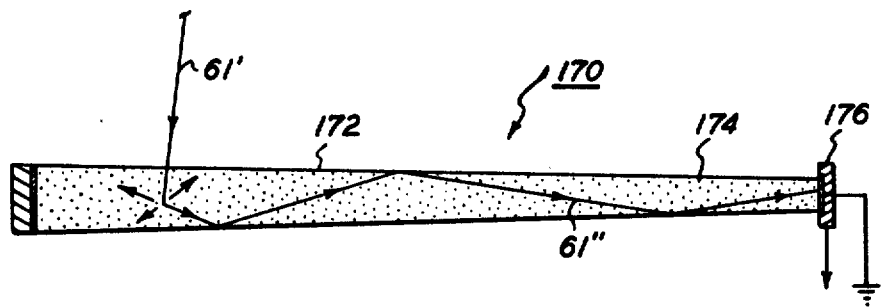
FIG. 10 is a cross-sectional view of a tapered fluorescent collector rod.

2. Another technique for adjusting the incident light intensity along the length of the rod is shown in FIG. 10 wherein detector 170 comprises a tapered fluorescent rod 172 containing a fluorescent dye 174 with relatively high transmissivity. With this configuration the absorption volume for the incident light becomes relatively larger with increasing distance from photosensor 176 permitting more light to enter, be absorbed and, therefore, reradiated. The proportional diameter decrease needed to obtain a uniform signal can be determined with minimum experimentation.

Figure 11:
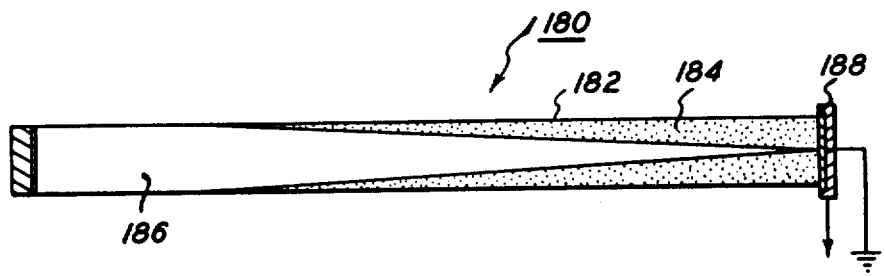
FIG. 11 is a view of another alternative embodiment of this invention.

FIG. 11 is a second embodiment wherein, instead of the rod being tapered, a tapered coating is applied to the protective cover surrounding rod surface (as in the FIG. 6c embodiment). Referring to FIG. 11, detector 180 is a cylindrical fluorescent rod 182 containing fluorescent dye 184 with relatively high transmissivity. The rod has a tapered reflective coating 186 placed on the back surface of the protective cover, i.e. opposite the light entrance aperture. The proportions of coating 186 are selected so maximum amounts of scattered and transmitted light are reflected back into rod 182 and reradiated at the end opposite the detector with decreasing amounts of reflection and reradiation occuring with decreasing distance to the photosensor. The result again is to smooth out the signal level impinging at the photosensor.

The same effect can be obtained by placing a mask in the path of the incident light, the mask having a tapered aperture thereon which controls the effective light entrance aperture. Detector 180 can be modified in several additional ways to obtain the same end result. For example, coating 186 can be a series of dots instead of a solid coating. And, the coating can be replaced by a specular reflecting surface placed on the rod in the manner shown in FIG. 6b.

A third method of adjusting incident light intensity is to vary the density of a reflective or absorption coating applied to the entrance aperture of the rod surface. This process is referred to as apodization. As an example, the FIG. 6c embodiment can be modified by altering the transmission of entrance window 146. The areas of the window furthest from the photosensor are made to have the highest transmission so that more of the incident light is delivered to rod 142. Areas of the coating window nearer the photosensor are of progressively lesser transmissivity. The net effect, again, is to smooth out the detector response. The apodization can be achieved by a variety of techniques. One method is to produce a desired density variation pattern photographically and then attach the strip to the rod entrance surface. The photographic technique includes a positive or a negative transparency. The desired apodization could also be achieved by placing a variable transmission filter in front of the reflector in the FIG. 6c embodiment to modify the transmittal light reflected from the reflector back into the rod. For this case, the rod must transmit a relatively high percentage of the incident light. These techniques lend themselves to other applications such as tailoring the entrance aperture to conform to specific illumination requirements, i.e. as illumination slits for photocopier applications.

3. Another way of adjusting the incident light intensity is to modify the scanning electronics. For example, in FIG. 1, scanner 59 can be modified to alter the intensity of the READ beam 63 with time so that a uniform signal level is achieved at the detector when a uniform reflecting surface is scanned.

EXAMPLE

An exemplary fluorescent-activated detector with high efficiency, good end-to-end uniformity and high signal to noise ratio was achieved with the following collector constructed according to the embodiment shown in FIG. 6b.

A 10.5 inch rod of 0.315" diameter having as the fluorescent dye, oxazine 170 perchlorate dissolved in a solid acrylic medium. A gold mirror was placed at one end of the rod and an EG&G DT-110 pin photodiode was optically coupled to the collector end with an epoxy potting cement. A visible spectrum blocking filter Corning CS2-64 was placed in front of the photodiode. A reflective coating on the back side of the outer jacket was apodized. This collector was used as the collector in the laser scanning system of FIG. 1 in conjunction with a HeNe laser light source of wavelength 632.8 nm.

Collector performance measurements were made at each step of the assembly. With the filter in place, collector end-to-end uniformity improved from ±28% to ±20%. Apodization of the jacket improved the end-to-end uniformity to ±10%.

This embodiment achieved a collector efficiency of 3%, a 50:1 signal to noise ratio (SNR) at 6 MHZ bandwidth and a 30:1 SNR at 20 MHZ bandwidth.

The end-to-end uniformity bandwidth and signal to noise characteristic of this embodiment illustrate the potential use of this type of detector in laser RIS systems, as pixel clocks for laser ROS and RIS systems and large area detectors for laser communication systems.

POLYCHROMATIC FLUORESCENT ACTIVATED DETECTORS

The specification thus far has considered detectors of monochromatic light. In another aspect of this invention, a broad band of illumination can be utilized by employing a series of light detectors, each containing a fluorescent dye having an excitation band matched to one of the major components comprising the illumination source. For example, a polychromatic image reflection can be collected by a minimum of at least two light detectors. In the preferred mode, an integrating cavity in conjunction with the light detector of this invention as illustrated in FIG. 6d, is utilized. There is thus provided, an integrating cavity having mounted therein at least two separate light detectors, each detector comprising a collector rod containing a dye which absorbs in the principle wavelength of a primary color. Further selectivity may be achieved by filtering the light each collector rod receives. Since the excitation and fluorescence spectra are different, the absorption of the filtration layer must be separated from the fluorescent medium. In addition, each detector must be shielded from light emitted or leaked from the other detectors so as to prevent fluorescence in the adjacent detectors due to the leaked light. Each detector thereby provides input data or digital recording of the image scanned including the color information which can be utilized to reconstruct the scanned polychromatic image. Utilizing digitally stored image information to reconstruct the original image is well known in the art. Of course, full, three color original image information is converted to digital information in accordance with this invention by utilizing at least three light detectors, each absorbing light in one of the principle wavelengths of the primary colors, red, green and blue.

Further, the amount of each color of light is also converted to digital information when means are provided in conjunction with the photosensor to measure the intensity of the signals. Thus, for example, when an original document containing a print of yellow color is scanned by a flying spot scanner composed of red, green and blue radiation, the reflections of the scan are absorbed by the detectors, collector rods which fluoresce in response to the principle wavelength of the red color as well as the light collector responding to the principle wavelength of the green color. If the original is a perfect yellow color, then the red and green lights will be of equal intensity and so detected by the photosensor. In this embodiment of the invention, it is preferred to utilize the means described above with respect to FIGS. 6a–d, 10 and 11 or a combination thereof to proportionately modify the amount of fluorescence obtained such that the amount of fluorescence detected is substantially the same throughout the body of detector 100. By this means, the intensity of fluorescence is directly related to the fraction of light of each individual color absorbed by each of the light detector rods. Also, in this embodiment of the invention wherein it is desired to digitally store a polychromatic image, a combination of a three color laser lines is utilized to scan the original image.

Figure 12:
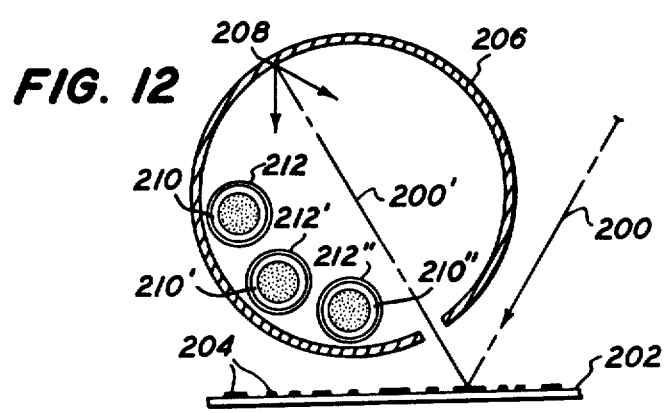
FIG. 12 is a cross-sectional view of a light detector of this invention capable of converting optical, polychromatic images into digital form.

A typical light detector suitable for collecting light reflected from a polychromatic image is provided by an apparatus such as described in FIG. 12. In FIG. 12, light beam 200 from a suitable light source such as a flying spot scanner strikes substrate 202 bearing image 204. Reflected light beam 200' enters integrating cavity 206 which is coated with a highly reflective surface as described above. The reflected light from the walls of integrating cavity 206 enter light detectors 210, 210' and 210" which may be, as for example, light collectors as described with regard to FIG. 6a. In the embodiment of FIG. 12, however, transparent protective covers 212, 212' and 212" additionally contain a filter which permits only the principle wavelengths of one primary color to be transmitted therethrough to strike light detectors 210, 210' and 210". Such filter material may be applied to the exterior of transparent protective covers 212, 212' and 212". Another function of the filter media on each of the protective covers is to block the fluorescent emission from the other light detectors. Thus, the respective red, green and blue filters permit, as nearly as possible only the principle wavelengths of each of the primary colors to reach the respective light collectors within. Thus, for example, image portions 204 may be of different colors while the flying spot beam 200 comprises at least two different colors, and, for three color imaging at least three colors. A component of light beam 200 would then be reflected from one portion of image 204 while another component of light beam 200 would be reflected from the other portion of image 204.

There has thus been described a novel, light detector useful in many applications to collect light reflected from an image on an image bearing substrate and to convert the light so collected into electronic information. Such information can be stored, transmitted or utilized in any manner as is well known in the art. For purposes of illustration, the light detector of this invention has been described in FIG. 1 with relationship to a multi-function copying apparatus. Obviously, the light collector of this invention may be utilized in conjunction with any scheme, process, or apparatus wherein the image to be scanned resides on a document substrate. It is well known that light reflected from a paper substrate is highly diffused and thus difficult to collect. However, the light detector of the present invention has been found to be highly suitable for collecting light reflected from images residing on paper because of the increased efficiency brought about by incorporation of a fluorescent medium in the collector rod.

It is to be understood that the above-described method and arrangements are simply illustrative of the application of the principles of the invention and that many modifications may be made without department from the spirit and scope thereof.

Figure 13:
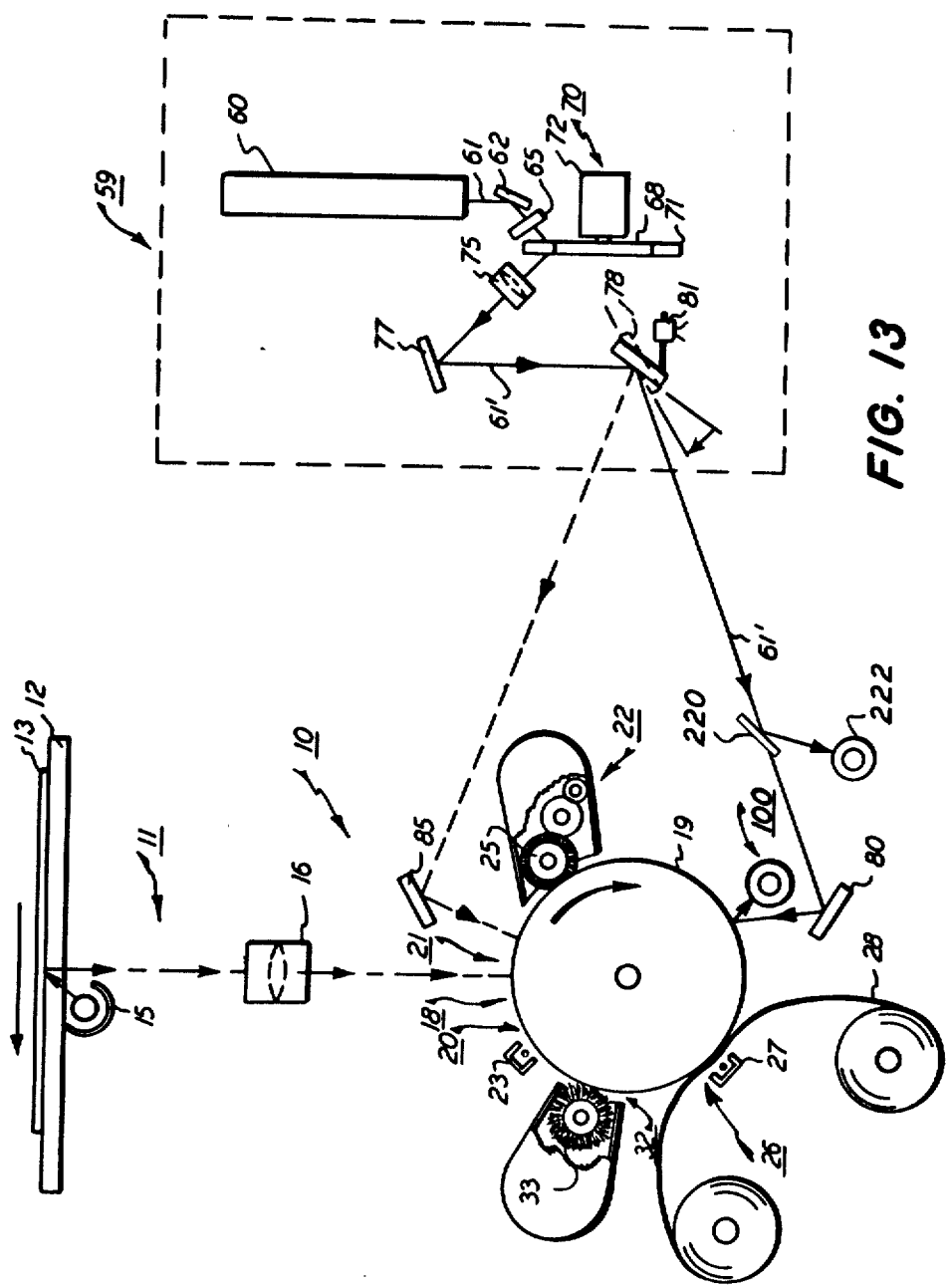
FIG. 13 is the apparatus of FIG. 1 modified to include the use of a light collector as part of a read clock.

For example, the detector lends itself to other light-monitoring functions such as a read clock to measure the scanning movement of a laser beam. FIG. 13 represents the system of FIG. 1 with the addition of two components, beamsplitter 220 placed in the path of the read beam and a second fluorescent-activated light detector 222. As the write beam is incident on beamsplitter 220, a fraction of the beam is diverted to detector 222. The photosensor within one end of detector 222 will produce a train of electrical signals, i.e. clocking pulses which are a direct measure of the scanning movement of laser beam 61', if a suitable encoding strip (Ronchi ruling) is placed between detector 222 and beamsplitter 220.

Figure 14:
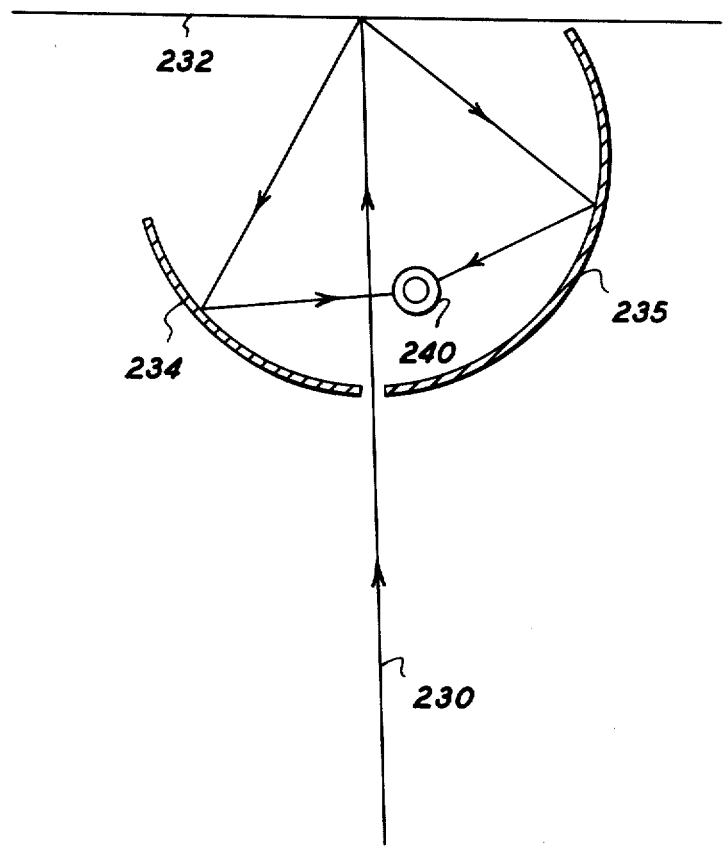
FIG. 14 shows yet another alternative embodiment of the invention wherein reflectors are used to more efficiently direct light to the fluorescent activated detector.

FIG. 14 illustrates another detector embodiment in which efficiency is increased by placing reflective elements in beam-focusing relationship to the detector. As shown, beam 230 is reflected from information bearing surface 232. Curved reflectors 234, 235 are designed and located so as to focus incident rays onto the surface of fluorescent activated detector 240. Reflectors 234, 235 may assume a parabolic or reflective configuration or may be a facetted reflector of the type described in U.S. Pat. No. 4,190,355.

As another example of an additional function of the detector of the present invention, the light output of a tubular light source such as a fluorescent lamp can be monitored. In applications where it is important to detect total average output, a conventional detector may give erroneous readings due to the movement of the "hot spot" within the tube. A fluorescent-activated light detector placed adjacent the lamp will average in the "hot spot" output, regardless of its position and detect the true average output over time. For example, in those systems wherein a diffusely reflective surface such as a paper document is being scanned, it may be desirable to place the detector a greater distance from the paper than the distance used to collect the specularly reflected light from a photoreceptor.

As an example of a still further modification, the collector rod can be so formed that the solid medium has a parabolic refractive index distribution which is highest in the center and decreases with increasing distance from the center. A fluorescent-activated detector having a solid collector with these characteristics would have less surface scatter and an increased capture ratio. Techniques for fabricating such a rod are described in an article by Yosup Othsuka et al. in Applied Optics, Vol. 20, No. 2, Jan. 15, 1981, whose contents are herein incorporated by reference.

What is claimed is:

1. A fluorescent-activated spatial quantitative light detector comprising
   an elongated rod-like member, said member comprising a fluorescent dye molecularly dispersed throughout a generally transparent solid material, and
   at least one photosensor in operative association with said member to detect fluorescent light emitted by said member upon exposure to incident light.

2. The apparatus of claim 1 wherein said photosensor is in optical contact with said medium.

3. The apparatus of claim 1 wherein said photosensor is separated from said medium by an air space equal to at least one wavelength of the emitted fluorescent light.

4. The apparatus of claim 1 wherein a photosensor is placed at each end of said member.

5. The apparatus of claim 1 wherein a photosensor is placed at one end of said member and a reflector at the other end.

6. The light detector of claim 1 wherein said rod-like member is a cylindrically tapered rod having said photosensor at one end thereof, said rod diameter increases with increasing distance from said photodetector.

7. The light detector of claim 1 wherein said rod-like member has a parabolic refractive index distribution which is highest in the center and decreases with increasing distance from the center.

8. The apparatus of claim 1 wherein the fluorescent medium absorbs light in the range of from about 65 percent to about 75 percent per centimeter of said medium of the incident light energy per centimeter of said medium.

9. The light detector of claim 1 further including an elongated light source placed in a parallel plane to said rod-like member whereby the spatial variation of light output from said light source is detected.

10. The apparatus of claim 1 wherein said photosensor is coupled to said medium by a plurality of optical fibers.

11. The apparatus of claim 10 wherein the diameter of said rod-like member is different than said photosensor.

12. The light detector of claim 1 wherein said rod-like member is a cylindrical rod and said photosensor is at one end thereof, and further including a reflective coating covering a portion of the surface of said rod.

13. The light detector of claim 12 wherein said reflective coating is of uniform density and has a surface area which generally decreases with decreasing distance to said photosensor.

14. The light detector of claim 12 wherein said reflective coating is apodized to improve uniformity of the signal generated by the photosensor.

15. The light detector of claim 1 further including a transparent cladding which encases said rod-like member.

16. The light detector of claim 15 further including a transparent elongated tube within which said rod-like member is placed.

17. The light collector of claim 16 wherein said tube and said member are separated by an air space.

18. In a flying spot scanning system adapted to raster scan on information bearing surface, a fluorescent-activated light detector for sensing light reflected from said scanned surface, said light detector comprising
a generally cylindrical rod containing a fluorescent dye dispersed throughout a generally transparent medium and a photosensor at one end of, and in operative association therewith,
whereby said reflected light incident on said light detector is absorbed by said dye and reradiated at the fluorescent wavelength, a portion of this reradiated light reaching the photosensor to generate an output signal therefrom.

19. The system of claim 20 further including a spectrum blocking filter placed before said photosensor, said filter blocking those light wavelengths contributing to a non-uniform light signal.

20. The system of claim 18 further including at least one reflective element placed adjacent said information bearing surface and said cylindrical rod, said reflector adapted to focus reflected light from said information bearing surface along the length of said rod.

21. The system of claim 18 further including a specular reflective surface at the end of the rod opposite the photosensor.

22. The system of claim 21 wherein said reflective surface is diffuse.

23. The system of claim 20 further including means to modify the amount of fluorescence produced in said rod proportional to the distance of the incident light from said photosensor so as to increase uniformity of the signal generated by the photosensor.

24. The system of claim 23 wherein said means is a variation in the amount of fluorescent dye along the length of said rod.

25. The system of claim 23 wherein said means is a variation in the cross-sectional area of said rod.

26. The system of claim 23 wherein said means is a variation in the cross-sectional area of the rod aperture.

27. The system of claim 23 wherein said means is a variation in the absorption volume of said rod.

28. The system of claim 23 wherein said means comprises a light absorbing filter placed before the photosensor.

29. The system of claim 23 wherein said means includes means for modulating the scanning beam so as to increase signal intensity at times when the incident beam is furthest from the photosensor.

30. The system of claim 23 further including a beamsplitter element located in the path of the scanning beam upstream of the scanned surface, said beamsplitter reflecting a portion of said scanning beam through a Ronchi-type ruling into a second fluorescent-activated light detector, said second detector producing a plurality of output clocking signals.

31. The system of claim 23 further including electronic data processing means connected to the output of said photosensor.

32. The system of claim 23 wherein said means comprises a reflective coating covering at least a portion of the rod opposite the light entering portion.

33. The system of claim 32 wherein said cylindrical rod is substantially transmissive of said incident light and wherein the reflective coating is tapered towards the photosensor end.

34. The system of claim 32 wherein said cylindrical rod is substantially transmissive of said incident light and wherein said reflective coating is apodized with decreasing density related to decreasing distance to the photosensor.

35. In a flying spot scanning system adapted to raster scan an information bearing surface, a light detector assembly for collecting light reflected from said scanned surface, said light detector assembly comprising
a generally cylindrical, hollow integrating cavity having a first entrance slit aligned with a second exit, re-entry slit disposed adjacent said scanned surface wherein a scanning beam enters the cavity through said first slit, passes through said second slit and is scattered from said scanned surface back into said cavity,
a fluorescent-activated light detector placed within said cavity, said detector comprising an elongated rod-like member containing a fluorescent dye molecularly dispersed throughout a generally transparent medium, said collector further comprising a photodetector optically coupled to said rod-like member,
whereby said light entering said cavity, following multiple diffuse reflections from the interior surfaces of said cavity is absorbed by said dye and scattered throughout said rod-like member, a portion of said light being coupled to said photosensor to provide an output signal representative of said scanned surface.

36. A light detector apparatus comprising at least two fluorescent-activated, spatial qualitative light detectors, each detector comprising an elongated rod-like member containing a fluorescent dye molecularly dispersed throughout a generally transparent medium each of said medium fluorescing in the principle wavelengths of a primary color media each medium provided with a filter medium to permit a narrow band of light to impinge upon said fluorescent medium, each medium emitting fluorescent light upon exposure to light of different wavelengths.

37. The apparatus of claim 36 further including a third light detector incorporating a dye which fluoresces in the principle wavelength of the third primary color.

38. The apparatus of claim 38 or 39 wherein said light detectors are enclosed within an integrating cavity having at least two apertures coordinated to permit a light beam to pass through both apertures to a substrate adjacent said detector, at least one of said apertures adapted to receive light reflected from said substrate into said cavity, each fluorescent medium emitting fluorescent light upon exposure to light of different wavelengths.

39. In a copying apparatus having a photoreceptor, means to charge said photoreceptor in preparation for imaging, exposure means for exposing said charged photoreceptor to produce a latent electrostatic image, developing means for developing the latent electrostatic image, transfer means to remove said developed image from said photoreceptor and read means to scan said developed image on said photoreceptor to provide electrical image signals representative of said developed image, said means including an integrated light collector, the improvement comprising an integrated light collector comprising a fluorescent medium in operative association with a light detector.

* * * * *